US011225625B2

(12) United States Patent
Horie et al.

(10) Patent No.: US 11,225,625 B2
(45) Date of Patent: *Jan. 18, 2022

(54) LUBRICANT MATERIAL FOR ASSISTING MACHINING PROCESS, LUBRICANT SHEET FOR ASSISTING MACHINING PROCESS, AND MACHINING METHOD

(71) Applicant: Mitsubishi Gas Chemical Company, Inc., Tokyo (JP)

(72) Inventors: Shigeru Horie, Tokyo (JP); Yousuke Matsuyama, Yonezawa (JP); Kazuhiro Nakamura, Yonezawa (JP); Kenji Ishikura, Yonezawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/613,681

(22) PCT Filed: May 24, 2018

(86) PCT No.: PCT/JP2018/019938
§ 371 (c)(1),
(2) Date: Nov. 14, 2019

(87) PCT Pub. No.: WO2018/216756
PCT Pub. Date: Nov. 29, 2018

(65) Prior Publication Data
US 2021/0062103 A1    Mar. 4, 2021

(30) Foreign Application Priority Data
May 25, 2017 (JP) .............................. JP2017-103798

(51) Int. Cl.
| C10M 107/34 | (2006.01) |
| B23B 35/00 | (2006.01) |
| C10M 125/02 | (2006.01) |
| C10M 169/04 | (2006.01) |
| C10N 50/00 | (2006.01) |
| C10N 20/00 | (2006.01) |
| C10N 20/04 | (2006.01) |
| C10N 40/22 | (2006.01) |

(52) U.S. Cl.
CPC ........... *C10M 107/34* (2013.01); *B23B 35/00* (2013.01); *C10M 125/02* (2013.01); *C10M 169/04* (2013.01); *B23B 2250/12* (2013.01); *C10N 2020/04* (2013.01); *C10N 2020/091* (2020.05); *C10N 2040/22* (2013.01); *C10N 2050/025* (2020.05)

(58) Field of Classification Search
CPC   C10M 107/12; C10M 107/24; C10M 107/26; C10M 107/28; C10M 107/32; C10M 111/04; C10M 125/02; C10M 103/02; C10M 107/00; C10M 107/34; C10M 107/36; C10M 107/38; C10M 107/42; C10M 107/44; C10M 2201/041; C10N 2020/04; C10N 2020/06; C10N 2030/16; C10N 2030/18; C10N 2040/20; B23Q 11/1046; B23Q 11/10; C09J 7/20; C09J 201/00; B23B 35/00
See application file for complete search history.

(56) References Cited

U.S. PATENT DOCUMENTS

| 3,220,893 A * | 11/1965 | Blackwood | C21D 1/60 148/638 |
|---|---|---|---|
| 4,052,323 A | 10/1977 | Feneberger et al. | |
| 4,519,732 A | 5/1985 | Sutcliffe | |
| 4,572,714 A | 2/1986 | Suzuki et al. | |
| 4,990,035 A | 2/1991 | Scheuch et al. | |
| 5,026,612 A * | 6/1991 | Selwood | B23K 11/185 29/469.5 |
| 5,082,402 A | 1/1992 | Gaku et al. | |
| 5,492,639 A | 2/1996 | Schneider et al. | |
| 5,507,603 A | 4/1996 | Nakano et al. | |
| 5,816,755 A | 10/1998 | Thelin | |
| 5,909,985 A | 6/1999 | Shiga et al. | |
| 6,164,876 A | 12/2000 | Cordovano | |
| 10,384,322 B2 | 8/2019 | Matsuyama et al. | |
| 10,518,341 B2 | 12/2019 | Matsuyama et al. | |
| 2002/0037400 A1 | 3/2002 | Fujiwara et al. | |
| 2002/0051684 A1 | 5/2002 | Eziri et al. | |
| 2002/0170178 A1 | 11/2002 | Zackrisson et al. | |
| 2003/0100456 A1 | 5/2003 | Hasaki et al. | |
| 2003/0152432 A1 | 8/2003 | Meece et al. | |
| 2004/0023059 A1 | 2/2004 | Kaburagi et al. | |

(Continued)

FOREIGN PATENT DOCUMENTS

| CN | 102504909 A | 6/2012 |
| CN | 104203512 A | 12/2014 |

(Continued)

OTHER PUBLICATIONS

International Search Report for PCT/JP2018/019938, dated Jul. 10, 2018, and English Translation submitted herewith (5 pages).
https://www.sigmaaldrich.com/catalog/product/aldrich/808113?lang=en&region=US (Year: 2018).
Zalucha et al., The Chemistry of Structural Adhesives: Epoxy, Urethane, and Acrylic Adhesives, 2007, p. 591 (Year: 2007).
U.S. Appl. No. 15/756,899, entitled "Entry Sheet For Drilling And Method For Drilling Processing Using Same," filed Mar. 1, 2018, which entered the U.S. national phase from International Application No. PCT/JP2016/075472, filed on Aug. 31, 2016.
U.S. Appl. No. 16/349,466, entitled "Material For Built-Up Edge Formation And Built-Up Edge Formation Method," filed May 13, 2019, which entered the U.S. national phase from International Application No. PCT/JP2017/039226, filed on Oct. 31, 2017.

(Continued)

*Primary Examiner* — Vishal V Vasisth
(74) *Attorney, Agent, or Firm* — Fitch, Even, Tabin & Flannery LLP

(57) ABSTRACT

A lubricant material for assisting machining process comprising a polyethylene oxide-polypropylene oxide copolymer having a weight average molecular weight of $5.0 \times 10^4$ or more and $2.0 \times 10^5$ or less.

16 Claims, No Drawings

(56) References Cited

U.S. PATENT DOCUMENTS

| | | |
|---|---|---|
| 2004/0191016 A1 | 9/2004 | Hintze et al. |
| 2005/0003169 A1 | 1/2005 | Ikeguchi et al. |
| 2005/0123363 A1 | 6/2005 | Ahmkiel et al. |
| 2007/0127997 A1 | 6/2007 | Muselli et al. |
| 2008/0170917 A1 | 7/2008 | Hilker |
| 2010/0028671 A1 | 2/2010 | Mitsui et al. |
| 2010/0054871 A1 | 3/2010 | Prakash |
| 2010/0172708 A1 | 7/2010 | Bolin et al. |
| 2012/0020749 A1 | 1/2012 | Maeda et al. |
| 2012/0039680 A1 | 2/2012 | Koike et al. |
| 2012/0051863 A1 | 3/2012 | Craig et al. |
| 2012/0219371 A1 | 8/2012 | Craig |
| 2012/0282044 A1 | 11/2012 | Volokh et al. |
| 2012/0294689 A1 | 11/2012 | Yagista |
| 2012/0315547 A1 | 12/2012 | Itoh et al. |
| 2013/0017025 A1 | 1/2013 | Azegami |
| 2013/0020735 A1 | 1/2013 | Hintze et al. |
| 2013/0170920 A1 | 7/2013 | Ogawa |
| 2013/0209184 A1 | 8/2013 | Barry et al. |
| 2013/0209190 A1 | 8/2013 | Oode et al. |
| 2014/0260884 A1 | 9/2014 | Hsieh |
| 2015/0072122 A1 | 3/2015 | Kamei et al. |
| 2015/0111049 A1 | 4/2015 | Matsuyama et al. |
| 2015/0125228 A1 | 5/2015 | Sugimoto et al. |
| 2015/0298355 A1 | 10/2015 | Ohlendorf |
| 2016/0045961 A1 | 2/2016 | Umehara et al. |
| 2017/0009171 A1 | 1/2017 | Soto-Castillo et al. |
| 2017/0100781 A1 | 4/2017 | Zhang et al. |
| 2017/0106606 A1 | 4/2017 | Toyozumi et al. |
| 2017/0111997 A1 | 4/2017 | Matsuyama et al. |
| 2017/0274461 A1 | 9/2017 | Mabuchi et al. |
| 2018/0229339 A1 | 8/2018 | Matsuyama et al. |

FOREIGN PATENT DOCUMENTS

| | | |
|---|---|---|
| CN | 104245256 A | 12/2014 |
| CN | 104321173 A | 1/2015 |
| CN | 105073355 A | 11/2015 |
| DE | 3531786 A1 | 3/1987 |
| EP | 0571352 A2 | 11/1993 |
| EP | 0608920 A1 | 8/1994 |
| EP | 0642297 A1 | 3/1995 |
| EP | 2979832 A1 | 2/2016 |
| EP | 3069709 A | 9/2016 |
| EP | 3333245 A1 | 6/2018 |
| EP | 3342517 A1 | 7/2018 |
| JP | S50-053768 A | 5/1975 |
| JP | S56-095991 A | 8/1981 |
| JP | 57-107718 A | 7/1982 |
| JP | S58-019716 B2 | 4/1983 |
| JP | H04-092494 A | 3/1992 |
| JP | H05-169400 A | 7/1993 |
| JP | H07-112311 A | 5/1995 |
| JP | H10-110183 A | 4/1998 |
| JP | 2000-015624 A | 1/2000 |
| JP | 2001-047307 A | 2/2001 |
| JP | 2001-098291 A | 4/2001 |
| JP | 2001-347602 A | 12/2001 |
| JP | 2002-301632 A | 10/2002 |
| JP | 2003-136485 A | 5/2003 |
| JP | 2003-175412 A | 6/2003 |
| JP | 2003-225814 A | 8/2003 |
| JP | 2003-301187 A | 10/2003 |
| JP | 2004-230470 A | 8/2004 |
| JP | 2005-019657 A | 1/2005 |
| JP | 2006-150557 A | 6/2006 |
| JP | 2006-181657 A | 7/2006 |
| JP | 2008222762 A * | 9/2008 |
| JP | 2011-020248 A | 2/2011 |
| JP | 2011-183548 A | 9/2011 |
| JP | 2012-178550 A | 9/2012 |
| JP | 2012-210689 A | 11/2012 |
| JP | 2013-146819 A | 8/2013 |
| JP | 2014-019157 A | 2/2014 |
| JP | 2015-160275 A | 9/2015 |
| KR | 100270173 B1 | 11/2000 |
| KR | 100635108 B1 | 10/2006 |
| SG | 11201506893 U | 9/2015 |
| SG | 11201710736X | 1/2018 |
| TW | 201349966 A | 12/2013 |
| WO | 2012/091179 A1 | 7/2012 |
| WO | 2013/132837 A1 | 9/2013 |
| WO | 2013/141299 A1 | 9/2013 |
| WO | 2013/146612 A1 | 10/2013 |
| WO | 2014/157570 A1 | 10/2014 |
| WO | 2015/152162 A1 | 10/2015 |
| WO | 2017/022822 A1 | 2/2017 |

OTHER PUBLICATIONS

U.S. Appl. No. 15/998,976, entitled "Cutting Work Method And Method For Producing Cut Product," filed Aug. 17, 2018, which entered the U.S. national phase from International Application No. PCT/JP2017/005724, filed on Feb. 16, 2017.

* cited by examiner

LUBRICANT MATERIAL FOR ASSISTING MACHINING PROCESS, LUBRICANT SHEET FOR ASSISTING MACHINING PROCESS, AND MACHINING METHOD

CROSS-REFERENCE TO RELATED APPLICATIONS

This application is a U.S. national phase application filed under 35 U.S.C. § 371 of International Application Number PCT/JP2018/019938, filed May 24, 2018, designating the United States, which claims priority from Japanese Application Number 2017-103798, filed May 25, 2017.

FIELD OF THE INVENTION

The present invention relates to a lubricant material for assisting machining process, a lubricant sheet for assisting machining process, and a machining method.

BACKGROUND OF THE INVENTION

High strength materials such as metals or alloys including titanium alloys, fiber reinforced plastics (FRP), and ceramic are industrially essential materials. However, as their strength increases, machining process for obtaining desired shapes becomes more difficult. In addition, tools for use in the processing are expensive and have a short lifespan. Although examples of the most widely used high strength materials as structural materials for aircraft include aluminum alloys, titanium alloys have a higher fracture strength than aluminum alloys for their density and have high corrosion resistance. Combining with carbon fiber reinforced plastic (CFRP) allows further reduction of the weight, and thus the proportion of titanium alloys in structural materials of aircraft tends to increase. Since titanium alloys are very difficult to weld, and CFRPs cannot be welded, joining of members using these materials is generally performed using fastening elements such as rivets, and high quality drilling using machining tools such as drills is required.

Additionally, nickel base alloys such as INCONEL® or WASPALOY® are used for parts such as an aircraft engine, particularly, where heat resistance is required. Aircraft engine parts often have complicated shapes and thus machining process is necessary. All of alloys as above generate a large amount of heat at the time of machining process and have low thermal conductivities relative to normal metals, so heat by machining process is readily concentrated on the tool. For this reason, due to the high material strength and the heat by machining process as the work material, the wear of the machining tool at the time of machining process becomes severe. The heat by machining process and the wear of the tool result in a decrease in processing quality from the viewpoints of the dimensional accuracy, the cut surface roughness, and the generation of burrs. Moreover, although the heat by machining process generated at the time of machining process of CFRP is small relative to that of the above-mentioned alloys, a portion of the carbon fiber remains uncut because of the reduction of the sharpness due to the wear of the machining tool, so that uncut fiber is generated at the cut portion such that the processing quality is lowered.

Some techniques for obtaining high-quality holes, for example, by drilling have already been proposed as machining methods for such high strength materials and composite materials containing them (hereinafter collectively referred to as "difficult-to-cut materials"). For example, Patent Literature 1 proposes a method which involves gradually changing the shape of a tool, for example, the curvature of a cutting face or the point angle of a drill.

CITATION LIST

Patent Literature

Patent Literature 1: Japanese Patent Application Laid-Open No. 2012-210689

SUMMARY OF INVENTION

Among machining processes with respect to metals and FRPs, drilling is a most commonly used process to provide holes, and in particular, in a case where high quality dimensional accuracy and cut surface roughness are required, finishing by reaming or boring is performed. In addition, in order to remove the burrs and uncut fiber on the entry side or the exit side generated by drilling, finishing with a deburring tool such as a chamfering cutter is performed. In the case of metallic materials among the difficult-to-cut materials, when the height of the burrs on the drill exit side is high in particular, heavy workload is applied to the removal of the burrs, and in the case of FRP, when delamination occurs on the drill exit side, the repair becomes very difficult. In order to reduce the workload for such finishing, the processing quality at the preliminary drilling and rough processing stages is important.

Further, in the machining process of the difficult-to-cut materials, the problem that as the wear of the machining tool progresses and the machining resistance increases, the quality of the cut surface is deteriorated is likely to occur. A necessity to advance the tool replacement timing thus arises to maintain the processing quality as a countermeasure thereto, and as a result, the ratio of the tool cost to the processing cost is still high.

In processing methods in the related art, machining fluids are generally used at the time of machining process of the difficult-to-cut metals. The machining fluid is supplied from an oil hole provided on an upper surface to be processed or a tool mainly for the purpose of cooling of the cut portion and imparting of lubricity. By the use of the machining fluid, it is possible to reduce to some extent the burrs generated on the drill exit side. The machining fluid is either oily or water soluble. The former is particularly excellent in lubricating performance, and the latter is excellent in cooling performance. Water soluble machining fluid is often used for processing of difficult-to-cut metals where heat by machining process generated at the time of machining process often arises as a problem.

The water soluble machining fluid includes a soluble type in which a water-soluble lubricating component is in an aqueous solution and an emulsion type in which an oily lubricating component is emulsified and dispersed, but both affect the human body and the environment greatly, and cause the problems of the deterioration of the working environment and liquid wastes. Further, due to the problem of scattering, the places where the performance of the machining fluid is sufficiently exerted are limited to machine tools that can perform processing in a closed system such as a machining center. For this reason, places where those can be actively used are limited at the assembly site of aircraft parts and automobile parts. In addition, in the case where the difficult-to-cut metal and FRP are used in combination, it is not preferable that the machining fluid adheres to the FRP, which restricts the use of the machining fluid.

Under such circumstances, the present inventors have found that by forming a water soluble resin composition in which a solid lubricating material is incorporated into a sheet and placing the sheet on the drill entry side or exit side of the difficult-to-cut material serving as the workpiece material allows the components of the sheet to transfer to the edge of the drill, and lubrication effect and cutting edge protection effect of the tool can thus be obtained. However, suppression of burrs generated at the time of drilling of the difficult-to-cut metals and uncut fiber generated at the time of drilling of FRP was insufficient.

The present invention has been made in view of the above problems, and an object of the present invention is to provide a lubricant material for assisting machining process, a lubricant sheet for assisting machining process, and a machining method with which burrs generated at the time of machining process of difficult-to-cut material, in particular, drilling of difficult-to-cut metal, uncut fiber due to uncut fibers generated at the time of drilling of FRP, or the like can be reduced.

As a result of extensive research in order to attain the object, the present inventors have completed the present invention by finding that the object can be attained by machining process a workpiece material using a lubricant material for assisting machining process in which a polyethylene oxide-polypropylene oxide copolymer having a predetermined weight average molecular weight is incorporated. Specifically, the present invention is as follows:

[1]
A lubricant material for assisting machining process comprising:
a polyethylene oxide-polypropylene oxide copolymer having a weight average molecular weight of $5.0 \times 10^4$ or more and $2.0 \times 10^5$ or less.

[2]
The lubricant material for assisting machining process according to [1], wherein
a content of a structural unit derived from the polyethylene oxide in the polyethylene oxide-polypropylene oxide copolymer is 80 to 95 mass % of the entire polyethylene oxide-polypropylene oxide copolymer, and the balance is a structural unit derived from polypropylene oxide.

[3]
A lubricant material for assisting machining process according to [1] or [2], further comprising:
a high molecular weight compound (A) having a weight average molecular weight of $5.0 \times 10^4$ or more and $1.0 \times 10^6$ or less, the high molecular weight compound (A) not being the polyethylene oxide-polypropylene oxide copolymer; and
a medium molecular weight compound (B) having a weight average molecular weight of $1.0 \times 10^3$ or more and less than $5.0 \times 10^4$.

[4]
The lubricant material for assisting machining process according to any one of [1] to [3], further comprising:
a graphite (C).

[5]
The lubricant material for assisting machining process according to [3] or [4], wherein
the high molecular weight compound (A) comprises a thermoplastic resin having a weight average molecular weight of $5.0 \times 10^4$ or more and $1.0 \times 10^6$ or less, and
the medium molecular weight compound (B) comprises a thermoplastic resin having a weight average molecular weight of $1.0 \times 10^3$ or more and less than $5.0 \times 10^4$.

[6]
The lubricant material for assisting machining process according to any one of [3] to [5], wherein
the high molecular weight compound (A) comprises a water soluble thermoplastic resin and/or a water insoluble thermoplastic resin, in which
the water soluble thermoplastic resin is one or more selected from the group consisting of a polyalkylene oxide compound, a polyalkylene glycol compound, an ester compound of polyalkylene glycol, an ether compound of polyalkylene glycol, a monostearate compound of polyalkylene glycol, a water soluble urethane, a water soluble polyether-based resin, a water soluble polyester, sodium poly(meth)acrylate, polyacrylamide, polyvinylpyrrolidone, polyvinyl alcohol, a saccharide, and a modified polyamide, and
the water insoluble thermoplastic resin is one or more selected from the group consisting of a urethane-based polymer, an acrylic-based polymer, a vinyl acetate-based polymer, a vinyl chloride-based polymer, a polyester-based polymer, a polystyrene-based resin, and a copolymer thereof.

[7]
The lubricant material for assisting machining process according to any one of [3] to [6], wherein
the high molecular weight compound (A) comprises polyethylene oxide having a weight average molecular weight of $3.0 \times 10^5$ or more and $1.0 \times 10^6$ or less.

[8]
The lubricant material for assisting machining process according to any one of [3] to [7], wherein
the medium molecular weight compound (B) is one or more selected from the group consisting of a polyalkylene glycol compound, a monoether compound of polyalkylene oxide, a monostearate compound of polyalkylene oxide, and a polyalkylene oxide compound.

[9]
The lubricant material for assisting machining process according to any one of [4] to [8], wherein
a content of the polyethylene oxide-polypropylene oxide copolymer is 10 to 30 parts by mass per 100 parts by mass in total of the polyethylene oxide-polypropylene oxide copolymer, the high molecular weight compound (A), the medium molecular weight compound (B), and the graphite (C).

[10]
A lubricant sheet for assisting machining process comprising:
the lubricant material for assisting machining process according to any one of [1] to [9].

[11]
The lubricant sheet for assisting machining process according to [10], comprising:
a layer comprising the lubricant material for assisting machining process; and
an adhesive layer formed on at least one surface of the layer comprising the lubricant material for assisting machining process.

[12]
The lubricant sheet for assisting machining process according to [11], wherein
the adhesive layer comprises an acrylic-based resin.

[13]
The lubricant sheet for assisting machining process according to any one of [10] to [12], wherein
the lubricant sheet for assisting machining process has a thickness of 0.1 to 20 mm.

[14]

A machining method comprising:

processing a workpiece material with a machine in a state where the lubricant material for assisting machining process according to any one of claims [1] to [9] or the lubricant sheet for assisting machining process according to any one of claims [10] to [13] is placed on the workpiece material.

[15]

The machining method according to [14], wherein a drilling machine is used as the machine, and the workpiece material is drilled with the drilling machine.

[16]

The machining method according to [14] or [15], in which the workpiece material is made of one or more selected from the group consisting of a titanium alloy, an aluminum alloy, a super heat resistant alloy, stainless steel, a carbon fiber reinforced plastic, an aramid reinforced plastic, and a composite material comprising these.

The present invention can provide a lubricant material for assisting machining process, a lubricant sheet for assisting machining process, and a machining method with which burrs generated at the time of machining process of difficult-to-cut material, in particular, drilling of difficult-to-cut metal, uncut fiber due to uncut fibers generated at the time of drilling of FRP, or the like can be reduced.

DESCRIPTION OF EMBODIMENTS

Hereinafter, the mode for carrying out the present invention (hereinafter, referred to as the "present embodiment") will be described in detail. However, the present invention is not intended to be limited by the present embodiment, and various changes or modifications can be made without departing from the spirit of the present invention. In the present embodiment, the "weight average molecular weight" may be measured by a method described in Examples.

Lubricant Material for Assisting Machining Process

A lubricant material for assisting machining process of the present embodiment contains a polyethylene oxide-polypropylene oxide copolymer having a predetermined weight average molecular weight.

Polyethylene Oxide-Polypropylene Oxide Copolymer

The polyethylene oxide-polypropylene oxide copolymer has a weight average molecular weight of $5.0 \times 10^4$ or more and $2.0 \times 10^5$ or less, preferably $6.0 \times 10^4$ or more and $1.8 \times 10^5$ or less, and more preferably $7.0 \times 10^4$ or more and $1.5 \times 10^5$ or less. When the weight average molecular weight of the polyethylene oxide-polypropylene oxide copolymer is within the above range, the transferability of the lubricating material to the cutting edge of the machining tool tends to be further improved without impairing the lubricity. On the other hand, in a case where the weight average molecular weight exceeds $2.0 \times 10^5$, the tackiness is insufficient, and the lubricating material transferability to the cutting edge of the tool sufficient to exert the lubricity cannot be obtained.

The polymerization form of the polyethylene oxide-polypropylene oxide copolymer is not particularly limited, and random copolymers, block copolymers, graft copolymers, or the like can be used without distinction. Further, the molecular structure of the polyethylene oxide-polypropylene oxide copolymer to be used may have, in addition to a linear structure, a structure having a partially branched or cyclic structure without distinction. Furthermore, the polyethylene oxide-polypropylene oxide copolymer to be used may be, in addition to a copolymer having a hydroxyl group as the terminal functional group thereof, a copolymer chemically modified with a functional group that does not cause corrosion or other deteriorations on the workpiece material without impairing the thermal stability of the copolymer. Examples of such functional groups include, but are not limited to, alkoxy groups and carboxylic acid esters. These polyethylene oxide-polypropylene oxide copolymers may be used singly or in combinations of two or more.

By incorporating such a polyethylene oxide-polypropylene oxide copolymer into the lubricant material for assisting machining process, it is possible to impart moderale flexibility and tackiness to the lubricant material for assisting machining process, and the transferability of the lubricating material to the cutting edge of the machining tool can be improved without impairing the lubricity. Here, in its mechanism of action, the lubricant material for assisting machining process is transferred to the cutting edge of the machining tool or to its periphery regardless of its form, and intervenes in the sliding portion between the cutting edge and the workpiece material at the time of machining process, thereby exerting lubricity and reducing friction, and consequently, the tool wear and deterioration of the processing quality of the workpiece material due to heat by friction are suppressed. Therefore, by improving the transferability of the lubricant material for assisting machining process to the cutting edge of the machining tool, it is possible to effectively increase the amount of the lubricating material supplied at the time of machining process and to more effectively develop the lubricity.

In particular, using the polyethylene oxide-polypropylene oxide copolymer decreases the crystallinity of the resin as compared to using ethylene oxide homopolymer, and this imparts flexibility and tackiness as physical properties of the resin. Such characteristics of the polyethylene oxide-polypropylene oxide copolymer contribute to imparting the flexibility and tackiness mentioned above and contribute to the more effective development of lubricity. On the other hand, the tackiness of the polyethylene oxide-polypropylene oxide copolymer tends to decrease as the molecular weight increases, while a decrease in the molecular weight of the resin leads to a decrease in the viscosity of the resin and to a decrease in the lubricity. Therefore, the weight average molecular weight of the polyethylene oxide-polypropylene oxide copolymer is required to be within the above-mentioned range.

Although the polymerization ratio of ethylene oxide to propylene oxide in the polyethylene oxide-polypropylene oxide copolymer is not particularly limited, the content of a structural unit derived from polyethylene oxide in the polyethylene oxide-polypropylene oxide copolymer is preferably 80 to 95 mass %, more preferably 84 to 94 mass %, and even more preferably 87 to 93 mass % of the entire polyethylene oxide-polypropylene oxide copolymer, and the balance is a structural unit derived from polypropylene oxide. When the content of the structural unit derived from polyethylene oxide and a structural unit derived from polypropylene oxide is within the above range, the transferability of the lubricating material to the cutting edge of the machining tool tends to be further improved without impairing the lubricity.

The content of the polyethylene oxide-polypropylene oxide copolymer is preferably, but is not particularly limited to, 10 to 30 parts by mass, more preferably 12 to 25 parts by mass, and even more preferably 15 to 20 parts by mass per 100 parts by mass in total of polyethylene oxide-polypropylene oxide copolymer, high molecular weight compound (A) described later, and medium molecular weight compound (B) described later, or in a case where a graphite (C) described later is further contained, per 100 parts by mass in total thereof further containing the graphite (C). When the content of the polyethylene oxide-polypropylene oxide copolymer is within the above range, the transferability of the lubricating material to the cutting edge of the machining tool tends to be further improved without impairing the lubricity.

In the case of using the high molecular weight compound (A) described later, the ratio of the content of the polyethylene oxide-polypropylene oxide copolymer to the content of the high molecular weight compound (A) is preferably 0.1 to 3 or less, more preferably 0.2 to 1 or less, and even more preferably 0.3 to 0.75 or less. When the high molecular weight compound (A), which exhibits lubricity, and the polyethylene oxide-polypropylene oxide copolymer, which exerts transferability to more effectively develop lubricity, are used in the above ratio, burrs and uncut fiber can further be reduced by synergistic effects attained by using the both.

High Molecular Weight Compound (A)

The lubricant material for assisting machining process of the present embodiment preferably further contains a high molecular weight compound (A). The high molecular weight compound (A) is not a polyethylene oxide-polypropylene oxide copolymer and has a weight average molecular weight of $5.0 \times 10^4$ or more and $1.0 \times 10^6$ or less, preferably $6.0 \times 10^4$ or more and $8.0 \times 10^5$ or less, more preferably $1.0 \times 10^5$ or more and $7.0 \times 10^5$ or less, and even more preferably $1.25 \times 10^5$ or more and $6 \times 10^5$ or less.

When the high molecular weight compound (A) is incorporated into the lubricant material for assisting machining process, the high molecular weight compound (A) functions as a lubricating material and improves the lubricity of the lubricant material for assisting machining process, and burrs, uncut fiber, and the like can further be reduced. The high molecular weight compound (A) also functions as a forming agent such that the formability of lubricant material for assisting machining process is improved and the single layer formability (feature that a layer (sheet) can be formed in itself without the use of a support base material) can be easily developed.

Examples of the high molecular weight compound (A) include, but are not particularly limited thereto, water soluble or water insoluble thermoplastic resins or water soluble or water insoluble thermosetting resins. Among them, a water soluble thermoplastic resin and/or a water insoluble thermoplastic resin is preferred, and a water soluble thermoplastic resin is more preferred. The "water soluble" "resin" refers to a high molecular weight compound that is dissolved in an amount of 1 g or more based on 100 g of water at 25° C. at 1 atm (the same applies hereinafter). Further, these high molecular weight compounds (A) may be used singly or in combinations of two or more. In the case of using two or more of the high molecular weight compounds (A) in combination, it is preferable that the respective compounds satisfy the weight average molecular weight described above.

Use of the water soluble thermoplastic resin or water soluble thermosetting resin tends to improve scrap discharge properties at the time of machining process by the lubricity thereof. Also, use of the water soluble thermoplastic resin or water soluble thermosetting resin moderately softens the surface hardness of the lubricant sheet for assisting machining process described later and therefore tends to be able to further reduce load to the machining tool and allows to easily remove the resin component adhered to sites on which the machining process has been performed after machining process. On the other hand, use of the water insoluble thermoplastic resin or water insoluble thermosetting resin tends to increase the surface hardness of the lubricant sheet for assisting machining process described later as compared with use of the water soluble thermoplastic resin or the water soluble thermosetting resin. This, for example, improves the biting performance of the machining tool at the time of machining process, can form a cut portion at a position as designed, further can increase the rigidity of the lubricant sheet for assisting machining process described later, and thus improves handleability.

The water soluble thermoplastic resin is preferably, but is not particularly limited to, for example, one or more selected from the group consisting of polyalkylene oxide compounds such as polyethylene oxide and polypropylene oxide; polyalkylene glycol compounds such as polyethylene glycol, polypropylene glycol, and polytetramethylene glycol; ester compounds of polyalkylene glycol; ether compounds of polyalkylene glycol; monostearate compounds of polyalkylene glycol, such as polyethylene glycol monostearate, polypropylene glycol monostearate, and polyglycerin monostearate; water soluble urethanes; water soluble polyether-based resins; water soluble polyesters; sodium poly(meth)acrylate; polyacrylamide; polyvinylpyrrolidone; polyvinyl alcohol; saccharides such as cellulose and derivatives thereof; and modified polyamides. Among them, one or more selected from the group consisting of polyethylene oxide, polyethylene glycol, and polyether water soluble resin are more preferred, polyethylene oxide is even more preferred, and polyethylene oxide having a weight average molecular weight of $3.0 \times 10^5$ or more and $1.0 \times 10^6$ or less is particularly preferred, from the viewpoint of further enhancing the function and effect exerted by the water soluble thermoplastic resin described above.

The water insoluble thermoplastic resin is preferably, but is not particularly limited to, for example, one or more selected from the group consisting of urethane-based polymers; acrylic-based polymers; vinyl acetate-based polymers; vinyl chloride-based polymers; polyester-based polymers; polystyrene-based resins exemplified by polyethylene wax, styrene homopolymers (GPPS), styrene-butadiene copolymers (HIPS), and styrene-(meth)acrylic acid copolymers (e.g., MS resin); and copolymers thereof.

The content of the high molecular weight compound (A) is preferably, but is not particularly limited to, 10 to 60 parts by mass, more preferably 20 to 55 parts by mass, even more preferably 25 to 50 parts by mass, and particularly preferably 30 to 45 parts by mass, per 100 parts by mass in total of the high molecular weight compound (A) and the medium molecular weight compound (B) described later, or in a case where graphite (C) described later is further contained, per 100 parts by mass in total thereof further containing the graphite (C).

When the content of the high molecular weight compound (A) is within the above range, there is a tendency that the lubricity and formability of the lubricant material for assisting machining process are further improved, the load on the machining tool is further reduced, and burrs, uncut fiber, and the like can even further be reduced.

Medium Molecular Weight Compound (B)

The lubricant material for assisting machining process of the present embodiment preferably further contains a medium molecular weight compound (B). The medium molecular weight compound (B) is a compound having a weight average molecular weight of $1.0 \times 10^3$ or more and less than $5.0 \times 10^4$, preferably $1.25 \times 10^3$ or more and $2.5 \times 10^4$ or less, more preferably $1.5 \times 10^3$ or more and $2.0 \times 10^4$ or less, even more preferably $2.0 \times 10^3$ or more and $1.0 \times 10^4$ or less, still more preferably $2.5 \times 10^3$ or more and $7.5 \times 10^3$ or less, and particularly preferably $3.0 \times 10^3$ or more and $5.0 \times 10^3$ or less.

When the medium molecular weight compound (B) is incorporated into the lubricant material for assisting machining process, the medium molecular weight compound (B) also functions as a lubricating material and improves the lubricity of the lubricant material for assisting machining process, and burrs, uncut fiber, and the like can even further be reduced. The medium molecular weight compound (B) also functions as a molding agent such that the formability of lubricant material for assisting machining process is improved, and the single layer formability can be easily developed.

Also, for example, when using only the high molecular weight compound (A) which is not the polyethylene oxide-polypropylene oxide copolymer, in addition to the polyethylene oxide-polypropylene oxide copolymer of the present embodiment as a lubricant material for assisting machining process, the lubricity and the formability of the lubricant material for assisting machining process may be decreased due to the viscosity of the lubricant material for assisting machining process becoming extremely high and the melting point becoming extremely high. Alternatively, when using only the medium molecular weight compound (B) in addition to the polyethylene oxide-polypropylene oxide copolymer of the present embodiment, the lubricity and the formability of the lubricant material for assisting machining process may be decreased also in this case due to the viscosity of the lubricant material for assisting machining process becoming extremely low and the melting point becoming extremely low. On the other hand, since the high molecular weight compound (A) and the medium molecular weight compound (B) having mutually different weight average molecular weights may each differ in melt viscosity and melting point, by using the high molecular weight compound (A) and the medium molecular weight compound (B) in combination in addition to the polyethylene oxide-polypropylene oxide copolymer of the present embodiment, it is possible to suppress the decrease in the lubricity and the formability of the lubricant material for assisting machining process which may occur when only the high molecular weight compound (A) or only the medium molecular weight compound (B) is added. As a result, there is a tendency that the load on the machining tool is further reduced, and burrs, uncut fiber, and the like can even further be reduced.

Examples of the medium molecular weight compound (B) include, but are not particularly limited to, water soluble or water insoluble thermoplastic resins or water soluble or water insoluble thermosetting resins. Among them, a water soluble thermoplastic resin and/or a water insoluble thermoplastic resin is preferred, and a water soluble thermoplastic resin is more preferred. These medium molecular weight compounds (B) may be used singly or in combinations of two or more. In the case of using two or more of the medium molecular weight compounds (B) in combination, it is preferable that the respective compounds satisfy the weight average molecular weight described above.

The water soluble thermoplastic resin is preferably, but is not particularly limited to, for example, one or more selected from the group consisting of, in addition to the resins that may be suitably used as the high molecular weight compound (A) described above, monoether compounds of polyalkylene oxide, such as polyethylene oxide oleyl ether, polyethylene oxide cetyl ether, polyethylene oxide stearyl ether, polyethylene oxide lauryl ether, polyethylene oxide nonyl phenyl ether, and polyethylene oxide octyl phenyl ether; and monostearate compounds of polyalkylene oxide, such as polyethylene oxide monostearate, polyethylene oxide sorbitan monostearate, and polyglycerin monostearate. Among these, one or more selected from the group consisting of a polyalkylene glycol compound, a monoether compound of polyalkylene oxide, a monostearate compound of polyalkylene oxide, and a polyalkylene oxide compound are more preferred, and polyethylene oxide monostearate is even more preferred, from the viewpoint of improving the lubricity of lubricant material for assisting machining process.

Examples of the water insoluble thermoplastic resin include, but are not particularly limited to, the resins that may be suitably used as the high molecular weight compound (A) described above.

The content of the medium molecular weight compound (B) is preferably, but is not particularly limited to, 10 to 75 parts by mass, more preferably 20 to 60 parts by mass, even more preferably 30 to 45 parts by mass, and still more preferably 35 to 40 parts by mass, per 100 parts by mass in total of the high molecular weight compound (A) and the medium molecular weight compound (B), or in a case where graphite (C) described later is further contained, per 100 parts by mass in total thereof further containing the graphite (C). When the content of the medium molecular weight compound (B) is within the above range, there is a tendency that the load on the machining tool is further reduced, and burrs, uncut fiber, and the like can even further be reduced.

Graphite (C)

The lubricant material for assisting machining process of the present embodiment preferably further contains a graphite (C). Examples of the graphite (C) include, but are not particularly limited to, natural graphite, artificial graphite, colloidal graphite, pyrolytic graphite, expanded graphite, and flake graphite. Among them, flake graphite is preferred. These graphite (C) may be used singly or in combinations of two or more.

When the graphite (C) is incorporated into the lubricant material for assisting machining process, the graphite (C) functions as a solid lubricating material and is capable of exerting the effects of improving the lubricity of the lubricant material for assisting machining process and prolonging the lifespan of the machining tool in processing. Furthermore, the graphite (C) exists in a solid state having a volume at a temperature of machining process and therefore, can suitably maintain the lubricity at the time of machining process. Furthermore, in a case where the graphite (C) contains flake graphite, the wear reduction performance tends to be further improved.

In machining process, particularly, continuous machining process, using the lubricant material for assisting machining process, the graphite (C) adheres to the surface or groove of the machining tool and the inner side face of a cut portion in the workpiece material to thereby exhibit lubricity. In this case, the graphite (C) less varies in volume and hardness due to change in temperature, as compared with the high molecular weight compound (A) and the medium molecular weight compound (B), and can therefore keep constant volume and hardness in machining process even if the temperature of the machining tool or a processing site is elevated. Specifically, the graphite (C) can reside normally, for example, between the machining tool and the workpiece material in machining process to enhance lubricity and exhibit effects similar to those of bearings, and thereby further suppress the wear of the machining tool. Furthermore, the graphite (C) has moderately high hardness as compared with other solid lubricating materials, and thus is particularly excellent in the development of the bearing effect and the lubricity described above. As a result, there is a tendency that the load to the machining tool is even further reduced and the occurrence of burrs, uncut fiber, and the like can be particularly further reduced.

The content of the graphite (C) is preferably, but is not particularly limited to, 5 to 70 parts by mass, more preferably 15 to 65 parts by mass, even more preferably 20 to 60 parts by mass, still more preferably 25 to 55 parts by mass, and particularly preferably 30 to 50 parts by mass, per 100 parts by mass in total of the high molecular weight compound (A), the medium molecular weight compound (B), and the graphite (C). When the content of the graphite (C) is within the above range, there is a tendency that the lubricity and formability of the lubricant material for assisting machining process are further improved, the load on the machining tool is further reduced, and burrs, uncut fiber, and the like can even further be reduced.

The average particle size of the graphite (C) is preferably, but is not particularly limited to, 50 to 1000 µm, more preferably 100 to 750 µm, even more preferably 150 to 500 µm, and particularly preferably 200 to 300 µm. When the average particle size of the graphite (C) is within the above range, there is a tendency that the lubricity and formability of the lubricant material for assisting machining process are further improved, the load on the machining tool (in particular, a drill used for drilling and the like), and the wear of the machining tool is further suppressed such that the lifespan of machining tool is further extended and burrs, uncut fiber, and the like can even further be reduced.

The average particle size of the graphite (C) in the present embodiment refers to a median size, and the median size means a particle diameter that is obtained from the cumulative distribution curve (number based) of particle sizes and becomes 50% height in the curve (D50 value), and can be measured by a method described in Examples. In the case of using two or more graphites (C) in combination, it is preferable that the respective kinds of graphites satisfy the average particle size described above.

Additional Component

The lubricant material for assisting machining process of the present embodiment may optionally contain an additional component in addition to the above components. Examples of the additional component include, but are not particularly limited to, lubricity improving components, formability improving components, plasticizers, softening agents, surface conditioners, leveling agents, antistatic agents, emulsifiers, antifoaming agents, wax additives, coupling agents, rheology controlling agents, antiseptics, antifungal agents, antioxidants, light stabilizers, nucleating agents, organic fillers, inorganic fillers, solid lubricating materials other than graphite (C), heat stabilizers, and colorants.

Lubricity Improving Component

Examples of the lubricity improving components include, but are not limited to, amide compounds exemplified by ethylenebisstearamide, oleic acid amide, stearic acid amide, and methylenebisstearamide; fatty acid compounds exemplified by lauric acid, stearic acid, palmitic acid, and oleic acid; fatty acid ester compounds exemplified by butyl stearate, butyl oleate, and glycol laurate; aliphatic hydrocarbon compounds exemplified by liquid paraffin; and higher aliphatic alcohols exemplified by oleyl alcohol. At least one of these can be selected. Hereinafter, some of these will be described.

Formability Improving Component

Examples of the formability improving components include, but are not particularly limited to, epoxy resins, phenol resins, cyanate resins, melamine resins, urea resins, and thermosetting polyimide, which are thermosetting resins. At least one of these can be selected.

Plasticizer/Softening Agent

Examples of the plasticizer and/or the softening agent include, but are not particularly limited to, phthalic acid ester, adipic acid ester, trimellitic acid ester, polyester, phosphoric acid ester, citric acid ester, epoxidized plant oil, and sebacic acid ester. When the lubricant material for assisting machining process is placed on the curved surface of a workpiece material (e.g., FRP), a plasticizer and/or a softening agent contained in the lubricant material for assisting machining process can suppress cracks in the lubricant material for assisting machining process, for example, by mitigating stress or strain applied to the lubricant material for assisting machining process, and tends to further improve the curved surface following properties.

Solid Lubricating Materials Other than Graphite (C)

Examples of the solid lubricating materials other than the graphite (C) include, but are not particularly limited to, molybdenum disulfide, tungsten disulfide, molybdenum compounds, polytetrafluoroethylene, and polyimide.

Applications

The lubricant material for assisting machining process of the present embodiment may be used, for example, as a lubricant material for assisting machining process in a molten state (liquid state). Although the form of the lubricant material for assisting machining process in the molten state is not particularly limited, examples thereof include a resin composition obtained by mixing the polyethylene oxide-polypropylene oxide copolymer, the high molecular weight compound (A), the medium molecular weight compound (B), and optionally the graphite (C) or additional components in the presence of a solvent or in the absence of a solvent. The lubricant material for assisting machining process of the present embodiment may be suitably used as a formed body of the lubricant sheet for assisting machining process or a lubricating block for assisting machining process having a shape such as a round bar or a square bar. These formed bodies may be formed by a known method in the related art. Hereinafter, the lubricant sheet for assisting machining process, which is particularly preferable, will be described.

Lubricant Sheet for Assisting Machining Process

The method of forming the lubricant sheet for assisting machining process is not particularly limited, and examples thereof include a method of mixing the polyethylene oxide-polypropylene oxide copolymer, the high molecular weight compound (A), and the medium molecular weight compound (B), and optionally the graphite (C) and additional components in the presence of a solvent or in the absence of a solvent to obtain a resin composition, applying the resin composition to a support, cooling and solidifying to form a sheet, and thereafter removing and peeling the support to obtain a lubricant sheet for assisting machining process (layer containing the lubricant material for assisting machining process) and a method of extruding the resin composition into a sheet shape and optionally stretching the sheet to obtain a lubricant sheet for assisting machining process (layer containing the lubricant material for assisting machining process).

The thickness of the lubricant sheet for assisting machining process (thickness of layer containing a lubricant material for assisting machining process that does not contain the adhesive layer or protective layer described later) is not particularly limited and is appropriately selected according to a machining method for the machining process of the workpiece material, a cut off method, the area or volume of a portion subjected to the machining process, the size of the machining tool for use in the machining process, the configuration of FRP, the thickness thereof, or the like, but is, for example, preferably 0.1 to 20 mm, more preferably 0.2 to 10 mm, and even more preferably 0.5 to 5 mm.

When the thickness of the lubricant sheet for assisting machining process is within the above range, there is a tendency that sufficient reduction of machining stress is obtained and there is a tendency to reduce the twining of the lubricant material for assisting machining process around the machining tool in machining process and be able to further suppress the occurrence of cracks in the lubricant material for assisting machining process. Furthermore, when the thickness of the lubricant sheet for assisting machining process is within the above range, the resin contained in the lubricant material for assisting machining process can be suppressed from serving as a binder for machining chips, and there is a tendency to be able to reduce machining chips from remaining in a cut portion. This tends to be able to suppress an increase in the inside irregularity of the cut portion. In short, the lubricity can be improved by securing the proper composition and thickness of the lubricant material for assisting machining process. The discharge of machining chips through the groove of the machining tool can be optimized for machining process. For even further obtaining the effects of the present invention, it is preferable to appropriately control the total thickness of the lubricant material for assisting machining process within the thickness range mentioned above. A plurality of thin lubricant material for assisting machining processs may be layered for use.

Adhesive Layer

The lubricant sheet for assisting machining process of the present embodiment may have, in addition to the layer containing the lubricant material for assisting machining process, for example, an adhesive layer (layer of an adhesive compound used to fix the workpiece material and the lubricant material for assisting machining process) for improving the close contact between the lubricant material for assisting machining process and the workpiece material, and a protective layer for preventing scratches on the surface of the lubricant material for assisting machining process. Examples of the method of forming another layer such as these adhesive layers and protective layer include, but are not particularly limited to, a method which involves forming a layer containing a lubricant material for assisting machining process in advance and directly forming another layer on at least one surface, and a method which involves laminating a layer containing the lubricant material for assisting machining process formed in advance and another layer by a lamination method with an adhesive resin or heat. The surface on which the adhesive layer is formed in the lubricant sheet for assisting machining process is the surface in contact with the workpiece material, and by having suchan adhesive layer, the close contact between the lubricant sheet for assisting machining process and the workpiece tends to be further improved.

The component constituting the adhesive layer is not particularly limited, and examples thereof include a thermoplastic resin and/or a thermosetting resin. Examples of the thermoplastic resin include, but are not particularly limited to, urethane-based polymers, acrylic-based polymers, vinyl acetate-based polymers, vinyl chloride-based polymers, polyester-based polymers, and copolymers thereof. Examples of the thermosetting resin include, but are not particularly limited to, resins such as phenol resins, epoxy resins, melamine resins, urea resins, unsaturated polyester resins, alkyd resins, polyurethane, thermosetting polyimide, and cyanate resins. Among them, an acrylic-based polymer is preferred because it is required to have the properties of leaving no paste on the workpiece material (e.g., FRP) and being capable of easily adhering at ordinary temperature. A solvent type acrylic pressure sensitive adhesive and an acrylic emulsion type pressure sensitive adhesive (aqueous) are more preferred.

The adhesive layer may optionally contain a degradation preventing agent such as an antioxidant, and an inorganic filler such as calcium carbonate, talc, or silica, in addition to components of the adhesive layer.

A method for forming the adhesive layer as a surface layer of the lubricant sheet for assisting machining process is not particularly limited as long as the method is a known method industrially used. Specific examples thereof include a method which involves forming the adhesive layer by a roll method, a curtain coating method, a spraying method, or the like and a method which involves forming in advance the adhesive layer having the desired thickness using a roll, a T-die extruder, or the like.

The thickness of the adhesive layer is not particularly limited, and the optimum thickness may be appropriately selected according to the curvature of the workpiece material and the configuration of the lubricant material for assisting machining process, and preferably, for example, 0.01 to 5 mm, and more preferably 0.05 to 2.5 mm. The thickness of each layer constituting the lubricant sheet for assisting machining process is measured as follows. First, the lubricant sheet for assisting machining process is cut off in a direction perpendicular to the lubricant sheet for assisting machining process using a cross section polisher (CROSS-SECTION POLISHER SM-09010 manufactured by JEOL Ltd. DATUM Solution Business Operations) or an ultramicrotome (EM UC7 manufactured by Leica Camera AG). Next, the plane of section is observed in a direction perpendicular to the plane of section using a scanning electron microscope (SEM) (VE-7800 manufactured by KEYENCE Corp.) to measure the thickness of each layer constituting the lubricant sheet for assisting machining process. In this operation, the thicknesses of 5 sites per field of view are measured, and an average value thereof is used as the thickness of each layer.

When the lubricant sheet for assisting machining process is removed from the workpiece material after the machining process, the amount of a component of the lubricant material for assisting machining process and/or the adhesive layer adhering to the workpiece material is preferably $1.0 \times 10^{-8}$ g or less, more preferably $5.0 \times 10^{-9}$ g or less, per 1 mm$^2$ of the areas of the contact portion between the workpiece material and the lubricant material for assisting machining process, and the processed portion. The lower limit of the amount of a component of the lubricant material for assisting machining process and/or the adhesive layer adhering to the workpiece material is not particularly limited and is preferably 0. In this context, for example in the case of drilling with a drill, the processed portion refers to the inside of a drilled hole.

Workpiece Material

The workpiece material is not particularly limited as long as the workpiece material is a metal, FRP, ceramic, or a composite material containing these. Examples of the metal include iron, aluminum, and titanium as well as alloys such as stainless steel (SUS), duralumin, carbon steel, and tool steel. FRP is not particularly limited as long as it is a composite material made of a matrix resin and a reinforcing fiber. Examples of the matrix resin include, but are not particularly limited to, thermosetting resins such as epoxy resins, phenol resins, cyanate resins, vinyl ester resins, and unsaturated polyester resins; and thermoplastic resins such as ABS (acrylonitrile-butadiene-styrene) resins, PA (polyamide) resins, PP (polypropylene) resins, PC (polycarbonate) resins, methyl methacrylate resins, and polyethylene, acryl, and polyester resins. Examples of the reinforcing fiber include, but are not particularly limited to, glass fiber, carbon fiber, and aramid fiber. Examples of the form of the reinforcing fiber include, but are not particularly limited to, filaments, tows, cloths, blades, chops, milled fibers, felt mats, papers, and prepregs. Specific examples of such FRP include, but are not particularly limited to, carbon fiber reinforced plastics (CFRP), glass fiber reinforced plastics (GFRP), and aramid fiber reinforced plastics (AFRP). Among them, a carbon fiber reinforced plastic (CFRP) relatively having large tensile strength and tensile elastic force and small density is preferred. FRP may optionally contain an additional component such as an inorganic filler or an organic filler. Examples of the ceramic include hard oxides such as alumina, quartz, and zirconia as well as carbides such as silicon carbide, and nitrides such as silicon nitride and gallium nitride. Examples of the form of the ceramic include, but are not particularly limited to, monocrystals, polycrystals, and sintered powders.

Method of Transferring Lubricant Material for Assisting Machining Process to Cutting Edge of Tool A method of transferring the lubricant material for assisting machining process of the present embodiment to the cutting edge of a tool is most preferably, but not particularly limited to, a method which involves closely contacting the lubricant sheet for assisting machining process provided with an adhesive layer with the portion to be cut of a workpiece material, and performing machining process with the lubricant sheet for assisting machining process. However, depending on the type of tool and machining process and the shape of the workpiece material, there may be cases where a method which involves transferring by machining the above-described lubricant block for assisting machining process with a tool used for processing in advance and then machining, a method which involves applying or spraying the above-described lubricant material for assisting machining process in a molten state (liquid state) to a portion to be cut of a workpiece material, or the like is more preferred.

Machining Process

The type of machining process where the lubricant material for assisting machining process of the present embodiment exerts more effect is the drilling, but in view of the mechanism of action of the lubricant material for assisting machining process, the application range is not limited to the drilling. However, from the viewpoint of improving the transferability of the lubricant material for assisting machining process of the present embodiment to the cutting edge of the tool, the lubricant material for assisting machining process particularly exerts the effect in through-hole drilling process in which the supply of the lubricant material for assisting machining process to the cutting edge of the tool is limited and the processing quality on the tool exit side tends to be poor.

The drilling in the present embodiment includes, in addition to the through-hole drilling with a drill, blind-hole (bottomed-hole) drilling with an end mill, circle interpolating drilling including long-hole drilling, seat hole drilling, tapping with a tap, and processing combining these, but not limited to these, and means processing to cut into the workpiece material perpendicular to the tool rotation direction. The lubricant material for assisting machining process of the present embodiment may be used without distinction for rough processing such as preliminary drilling and finishing such as reaming or boring and may also be used for multistage drilling such as deep drilling after guide drilling which is drilling with a large diameter tool after drilling with a small diameter tool. In addition, there are cases where higher processing quality can be obtained by combining known processing options such as step processing, center through air or mist processing, and air blow, which promote the discharge of chips at the time of processing. The machine tool may be used by appropriately selecting from or combining a hand drill, a drilling machine, a milling machine, an NC lathe, a machining center, a five-axis machine, or the like according to the material and shape of the workpiece material and the shape of the hole to be processed.

In addition, machining process other than drilling is not particularly limited as long as a machining tool is used, examples thereof include milling with an end mill, a router, or the like, face milling with a face milling cutter, a flat milling cutter, an end mill, or the like, machining process using a circular saw, grinding stone, an end mill, or the like, grinding using a grinding wheel, a curved surface processing using a radius end mill, a ball end mill, or the like, and turning with a tool bit. The lubricant material for assisting machining process of the present embodiment may be used without distinction for rough processing, finishing, and multistage processing even in machining process other than drilling. In addition, there are cases where higher processing quality can be obtained by combining known processing options such as step processing, center through air or mist processing, and air blow, which promote the discharge of chips at the time of processing. The machine tool may be used by appropriately selecting from or combining a hand drill, a drilling machine, a milling machine, an NC lathe, a machining center, a five-axis machine, circular saw, grinding stone, a grinding machine, or the like according to the material and shape of the workpiece material and the shape of the hole to be processed.

Machining Tool

The machining tool is not particularly limited and is appropriately selected according to the material and shape of the workpiece material, the processing shape, and the type of machine tool. As the base material of the tool, high speed steel, hard metal, sintered body of polycrystalline boron nitride or the like is used. Further, as the machining tool, various coated tools may be used in addition to non-coated tools, and in any case, it is possible to obtain the effects exhibited by the lubricant material for assisting machining process of the present embodiment. Examples of the coating of the tool include a diamond coat, a titanium nitride coat, a diamond-like carbon coat, and a ceramic coat.

Examples

Hereinafter, the present invention will further be specifically described with reference to Examples and Comparative Examples. The following Examples are given merely for illustrating one example of the embodiment of the present invention, and the present invention is not at all limited to these Examples.

Example 1

Production of Lubricant Sheet for Assisting Machining Process 2500 parts by mass of polyethylene oxide-polypropylene oxide copolymer (Alkox EP-1010N manufactured by Meisei Chemical Works, Ltd., weight average molecular weight=$1.0 \times 10^5$), 1500 parts by mass of polyethylene oxide (Alkox E-45 manufactured by Meisei Chemical Works, Ltd., weight average molecular weight=$5.6 \times 10^5$) as the high molecular weight compound (A), 2500 parts by mass of polyethylene oxide monostearate (Nonion S-40 manufactured by NOF CORPORATION, weight average molecular weight=$3.5 \times 10^3$) as the medium molecular weight compound (B), and 3500 parts by mass of the graphite (C) (XD-100, Ito Graphite Co., Ltd., average particle size=250 μm, flake shape) were extruded at a temperature of 140° C. using a single screw extruder to produce a layer containing a lubricant material for assisting machining process having a thickness of 1.0 mm. The strongly pressure-sensitive adhesive face of double faced tape having a thickness of 0.12 mm (No. 535A, manufactured by Nitto Denko Corporation) was affixed to one side of this layer containing a lubricant material for assisting machining process to obtain a lubricant sheet for assisting machining process.

The average particle size (median size) of the graphite (C) was determined by dispersing its particles in a solution composed of a hexametaphosphoric acid solution and a few drops of triton and measuring the respective maximum lengths of projected particles using a laser diffraction particle size distribution analyzer. Then, the cumulative distribution curve (number based) of particle sizes was calculated. A particle diameter that became 50% height in the cumulative distribution curve (number based) was used as the average particle size.

The weight average molecular weights of the polyethylene oxide-polypropylene oxide copolymer, the high molecular weight compound (A), and the medium molecular weight compound (B) were calculated as relative average molecular weights by dissolving and dispersing each of the polyethylene oxide-polypropylene oxide copolymer, the high molecular weight compound (A), and the medium molecular weight compound (B) in a 0.05% salt solution, followed by measurement by liquid chromatography involving GPC (gel permeation chromatography) columns with polyethylene glycol as standards.

Titanium Alloy Drilling

The produced lubricant sheet for assisting machining processes were affixed to one surface of a workpiece material of a titanium alloy plate (Ti—6Al—4V) having a width 280 mm×depth 80 mm and a thickness of 20 mm. Subsequently, the titanium alloy plate was held from the back and forth and fixed such that the lower side (drill exit side) of the titanium alloy plate is free on the machine vise equipped on the machining center (manufactured by Yamazaki Mazak Corporation, vertical machining center "VCN-535C") with the surface on which the lubricant sheet for assisting machining process was affixed facing upwards. Next, a coated carbide drill with a blade diameter of 6 mmφ (manufactured by OSG Corporation, carbide SUS drill "ADO-SUS 3D 6") was held in a tool holder, and through-hole drilling was performed continuously for 25 holes while blowing air toward the machining point from diagonally above 45° under machining conditions of a circumferential speed of 20 m/min and a feed per rotation of 0.10 mm/rev (feed per rotation 0.020 mm/rev in the range of hole depth 18 to 20 mm).

Measurement of Back Burr Height of Titanium Alloy Plate

The measurement of the burr height on the drill exit side of the titanium alloy plate after drilling was performed by the following method. First, with an optical microscope, the processed end on the drill exit side of the titanium alloy plate was photographed at a magnification of 40 times. Subsequently, the average height of the surface of the titanium alloy plate and the height of the convex portion at the processed end (the apex of the back burr) were determined by image processing, and the difference was calculated as the back burr height. The measurement points of the back burr heights of each of the holes were 8 different points from each other in which the angle between the straight lines connecting two adjacent points on the circumference of the approximate circle obtained by circularly approximating the end portion on the drill exit side to the center of the approximate circle respectively is 45°, and the average value of the back burr heights of these 8 points was taken as the average back burr height of each hole. Moreover, the average value of the average back burr height of the 1st, 5th, 10th, 15th, 20th, and 25th holes was taken as the 6-hole average back burr height. As a result, the 6-hole average back burr height in Example 1 was 97 μm. The results of the composition of the lubricant material for assisting machining process and the 6-hole average back burr height are shown in Table 1.

Examples 2 and 3 and Comparative Examples 1 to 4

Lubricant sheet for assisting machining processes were produced in the same manner as in Example 1 except that the lubricant material for assisting machining processes had the compositions described in Table 1, and the average back burr heights on six-holes were measured by drilling titanium alloy plates (drilling was performed without using lubricant material for assisting machining process in Comparative Example 4). The results of the compositions of the lubricant material for assisting machining process and the 6-hole average back burr height are shown together in Table 1.

TABLE 1

|  | Example 1 | Example 2 | Example 3 | Comparative Example 1 | Comparative Example 2 | Comparative Example 3 | Comparative Example 4 |
|---|---|---|---|---|---|---|---|
| Copolymer [parts by mass] | 1500 | 1500 | 3000 | 1000 | 1000 | — | — |
| High molecular weight compound (A) [parts by mass] | 2500 | 1500 | 1000 | 2000 | 2000 | 3000 | |
| Medium molecular weight compound (B) [parts by mass] | 2500 | 3500 | 2500 | 3500 | 3500 | 3000 | |
| Graphite (C) [parts by mass] | 3500 | 3500 | 3500 | 3500 | 3500 | 3500 | |
| Copolymer weight average molecular weight | $1.0 \times 10^5$ | $1.0 \times 10^5$ | $1.0 \times 10^5$ | $8.0 \times 10^5$ | $1.0 \times 10^6$ | — | |
| High molecular weight compound (A) weight average molecular weight | $5.6 \times 10^5$ | $5.6 \times 10^5$ | $5.6 \times 10^5$ | $5.6 \times 10^5$ | $5.6 \times 10^5$ | $5.6 \times 10^5$ | |
| Medium molecular weight compound (B) weight average molecular weight | $3.5 \times 10^3$ | $3.5 \times 10^3$ | $3.5 \times 10^3$ | $3.5 \times 10^3$ | $3.5 \times 10^3$ | $3.5 \times 10^3$ | |
| Content of structural unit derived from PEO in copolymer [mass %] | 90 | 90 | 90 | 80 | 90 | 90 | |
| 6-hole average back burr height [μm] | 97 | 107 | 126 | 157 | 146 | 174 | 225 |

Note:
"PEO" refers to polyethylene oxide.

From the above results, it has been found that it is possible to perform machining process with high machining quality with reduced burr generation by using a lubricant sheet for assisting machining process containing a lubricant material for assisting machining process in which polyethylene oxide-polypropylene oxide copolymer is incorporated at the time of machining process a workpiece material, in particular, a difficult-to-cut material.

The lubricant material for assisting machining process, lubricant sheet for assisting machining process, and machining method of the present invention improve the processing quality in machining process of a workpiece material, in particular, a difficult-to-cut material and reduce processing cost, and therefore have industrial applicability.

The invention claimed is:

1. A lubricant material for assisting machining process comprising:
   a polyethylene oxide-polypropylene oxide copolymer having a weight average molecular weight of $5.0 \times 10^4$ or more and $2.0 \times 10^5$ or less,
   a high molecular weight compound (A) having a weight average molecular weight of $5.0 \times 10^4$ or more and $1.0 \times 10^6$ or less, the high molecular weight compound (A) not being the polyethylene oxide-polypropylene oxide copolymer;
   a medium molecular weight compound (B) having a weight average molecular weight of $1.0 \times 10^3$ or more and less than $5.0 \times 10^4$; and
   a graphite (C)
   wherein
   a content of a structural unit derived from the polyethylene oxide in the polyethylene oxide-polypropylene oxide copolymer is 80 to 95 mass % of the entire polyethylene oxide-polypropylene oxide copolymer, and the balance is a structural unit derived from polypropylene oxide; and
   a content of the polyethylene oxide-polypropylene oxide copolymer is 10 to 30 parts by mass per 100 parts by mass in total of the polyethylene oxide-polypropylene oxide copolymer, the high molecular weight compound (A), the medium molecular weight compound (B), and the graphite (C).

2. The lubricant material for assisting machining process according to claim 1, wherein
   the high molecular weight compound (A) comprises a thermoplastic resin having a weight average molecular weight of $5.0 \times 10^4$ or more and $1.0 \times 10^6$ or less, and
   the medium molecular weight compound (B) comprises a thermoplastic resin having a weight average molecular weight of $1.0 \times 10^3$ or more and less than $5.0 \times 10^4$.

3. The lubricant material for assisting machining process according to claim 1, wherein
   the high molecular weight compound (A) comprises a water soluble thermoplastic resin and/or a water insoluble thermoplastic resin, in which the water soluble thermoplastic resin is one or more selected from the group consisting of a polyalkylene oxide compound, a polyalkylene glycol compound, an ester compound of polyalkylene glycol, an ether compound of polyalkylene glycol, a monostearate compound of polyalkylene glycol, a water soluble urethane, a water soluble polyether-based resin, a water soluble polyester, sodium poly(meth)acrylate, polyacrylamide, polyvinylpyrrolidone, polyvinyl alcohol, a saccharide, and a modified polyamide, and the water insoluble thermoplastic resin is one or more selected from the group consisting of a urethane-based polymer, an acrylic-based polymer, a vinyl acetate-based polymer, a vinyl chloride-based polymer, a polyester-based polymer, a polystyrene-based resin, and a copolymer thereof.

4. The lubricant material for assisting machining process according to claim 1, wherein
the high molecular weight compound (A) comprises polyethylene oxide having a weight average molecular weight of $3.0 \times 10^5$ or more and $1.0 \times 10^6$ or less.

5. The lubricant material for assisting machining process according to claim 1, wherein
the medium molecular weight compound (B) is one or more selected from the group consisting of a polyalkylene glycol compound, a monoether compound of polyalkylene oxide, a monostearate compound of polyalkylene oxide, and a polyalkylene oxide compound.

6. A lubricant sheet for assisting machining process comprising:
the lubricant material for assisting machining process according to claim 1.

7. The lubricant sheet for assisting machining process according to claim 6, comprising:
a layer comprising the lubricant material for assisting machining process; and
an adhesive layer formed on at least one surface of the layer comprising the lubricant material for assisting machining process.

8. The lubricant sheet for assisting machining process according to claim 7, wherein
the adhesive layer comprises an acrylic-based resin.

9. The lubricant sheet for assisting machining process according to claim 6, wherein
the lubricant sheet for assisting machining process has a thickness of 0.1 to 20 mm.

10. A machining method comprising:
processing a workpiece material with a machine in a state where the lubricant material for assisting machining process according to claim 1 is placed on the workpiece material.

11. The machining method according to claim 10, wherein
a drilling machine is used as the machine, and the workpiece material is drilled with the drilling machine.

12. The machining method according to claim 10, wherein
the workpiece material is made of one or more selected from the group consisting of a titanium alloy, an aluminum alloy, a super heat resistant alloy, stainless steel, a carbon fiber reinforced plastic, an aramid reinforced plastic, and a composite material comprising these.

13. A machining method comprising:
processing a workpiece material with a machine in a state where the lubricant sheet for assisting machining process according to claim 6 is placed on the workpiece material.

14. The machining method according to claim 13, wherein
a drilling machine is used as the machine, and the workpiece material is drilled with the drilling machine.

15. The machining method according to claim 13, wherein
the workpiece material is made of one or more selected from the group consisting of a titanium alloy, an aluminum alloy, a super heat resistant alloy, stainless steel, a carbon fiber reinforced plastic, an aramid reinforced plastic, and composites thereof.

16. The lubricant material for assisting machining process according to claim 1, wherein
the ratio of the content of the polyethylene oxide-polypropylene oxide copolymer to the content of the high molecular weight compound (A) is 0.1 to 3.

* * * * *